Figure 1:
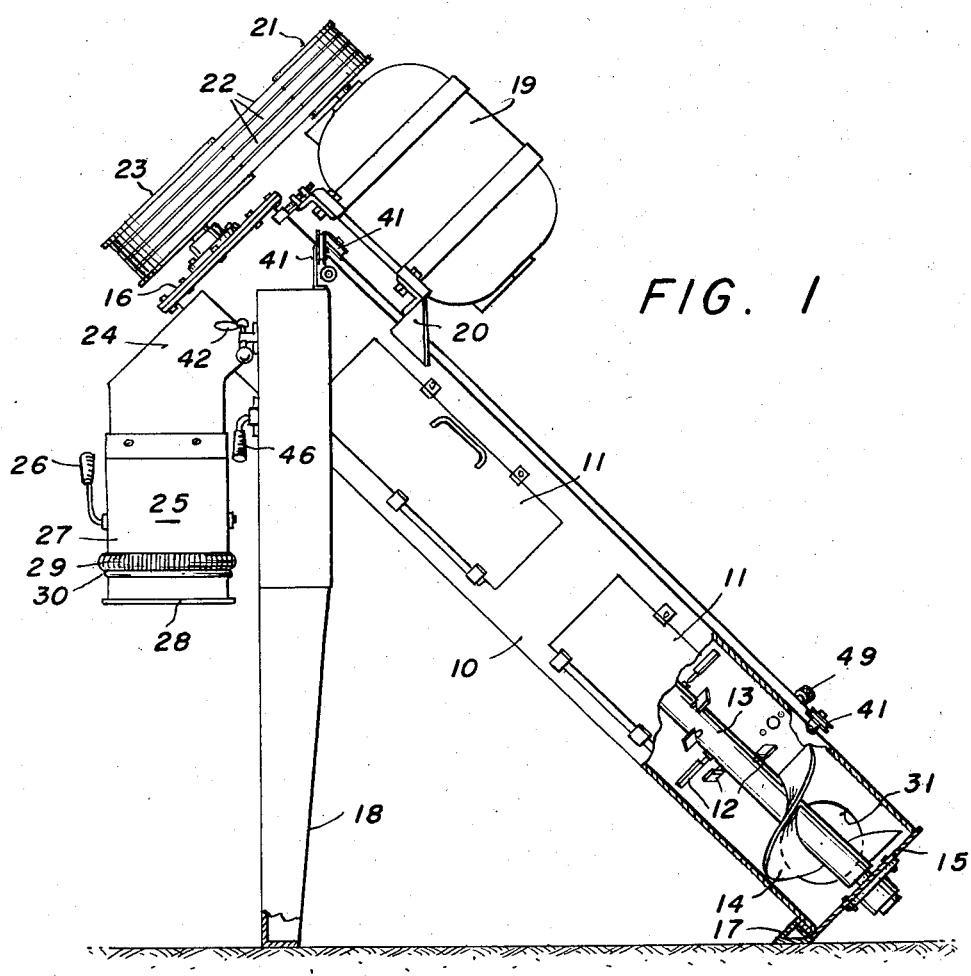

May 26, 1959 G. W. REAVES ET AL 2,888,045
FEED MIXERS AND BLENDERS
Filed Sept. 28, 1956 2 Sheets-Sheet 1

INVENTOR
GEORGE W. REAVES
PAUL M. PALMER
ROBERT G. WINKLE
BY
ATTORNEY

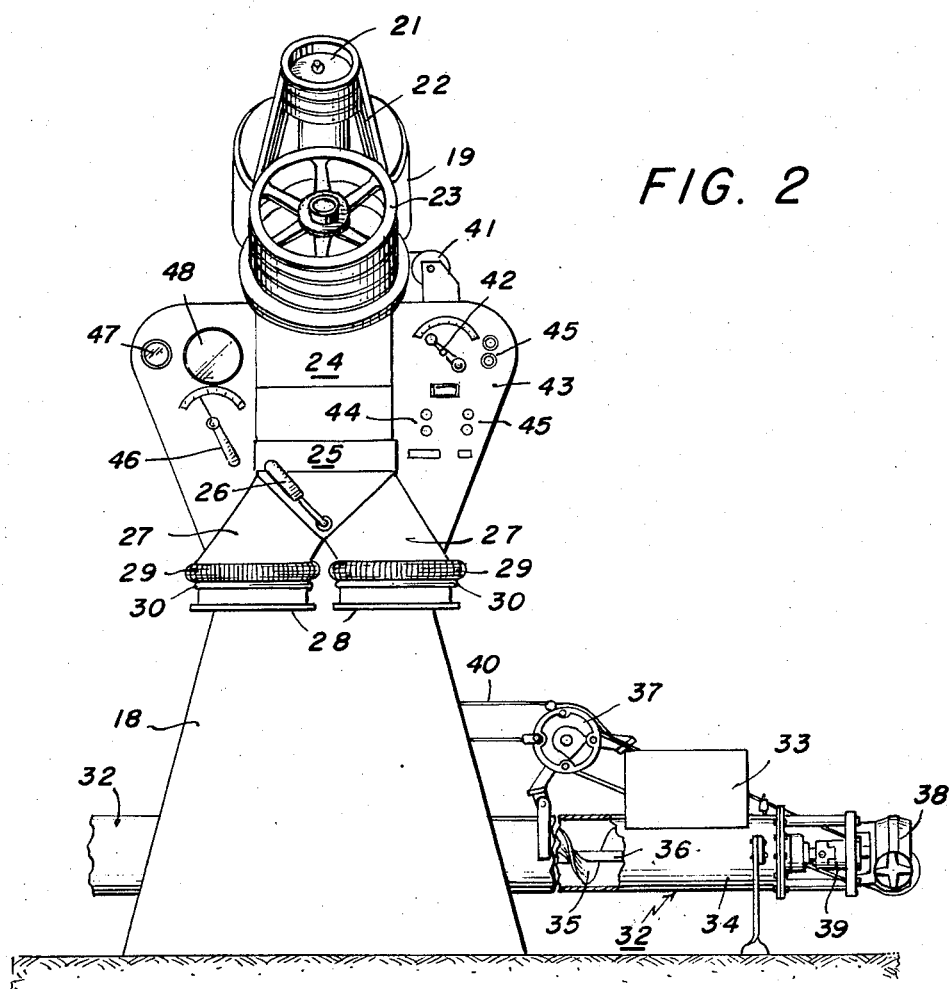

_United States Patent Office_

2,888,045
Patented May 26, 1959

2,888,045

FEED MIXERS AND BLENDERS

George W. Reaves, Signal Mountain, and Paul M. Palmer, Chattanooga, Tenn., and Robert G. Winkle, Ringgold, Ga.

Application September 28, 1956, Serial No. 612,859

3 Claims. (Cl. 141—69)

This invention relates to feed mixers and blenders where it is desired to obtain thorough and even mixing of fluid materials with solid food ingredients.

The object of the present invention is to devise a machine to economically and efficiently mix a dry food, e.g. ground cattle feed such as corn, with molasses in desired proportions, to evenly coat all particles of the food with a fine coating of the molasses without leaving any concentrations of the latter in sweet liquid balls, lumps or semi-mixtures.

A further object is to use an inclined screw conveyor in the above machine to feed the food upwardly through a portion having a series of paddles in place of the continuous screw blade, to provide a good mixing and even distribution of the liquid throughout the mass of solid particles by permitting some of the particles to fall back through between the paddles into any voids behind such paddles, whereby a substantially full conveyor is maintained in the mixing portion, no matter how large the voids may be in the solid screw blade portion of the conveyor behind this mixing portion.

A further object is to introduce the liquid into the top of the conveyor near the lower end of the mixing portion through a fine spray nozzle, to facilitate its even distribution over the surfaces of the looser mass of solid particles being fed into the mixing portion at the beginning of the mixing process.

A further object is to provide a wide cone high pressure spray valve at the nozzle and a metering control valve in the line leading to said nozzle to control the rate of injection of the fine spray in accordance with the rate of feed of the particles through the conveyor.

A further object is to feed the liquid into said line at a constant high pressure to said control valve.

A further object is to provide means for increasing the minimum pressure required to open said spray valve if desired, in order to accommodate liquids of higher viscosity, to obtain a sufficiently fine spray without requiring any heating of the liquid, such as molasses, to reduce its viscosity.

A further object is to provide means for controlling the rate of feed of said dry particles to said conveyor.

A further object is to provide a collector conduit at the discharge end of the mixing portion leading downwardly into an inverted Y passage controlled by a cut-off flap for alternatively directing the discharge into opposite sides of the Y, through which a sackful of the blended mixture at a time may be funnelled into sacks alternately attached to these side passages at required intervals in accordance with the rate of feed of said particles.

A further object is to arrange the operating controls for the machine on the discharge side of the machine in a convenient place for the sacker to manipulate during the operation of the machine.

A further object is to provide variable speed horizontal conveyor means for the ground food from a station near the grinder to the bottom of the inclined conveyor, for controlling the rate of feed of said ground food.

Figure 3:
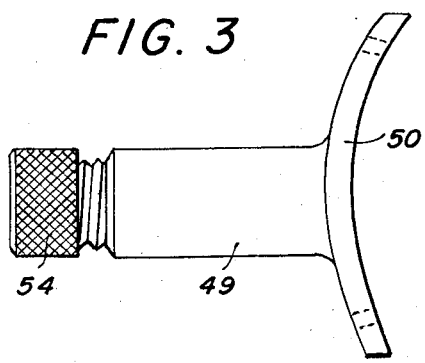
Figure 4:
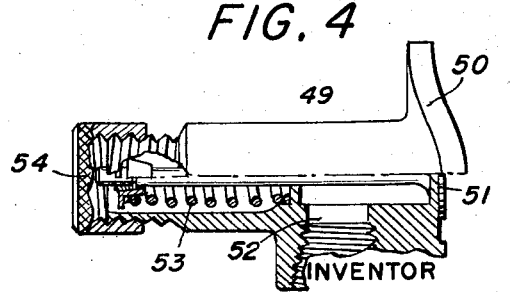

Other and more specific objects will appear in the following detailed description of preferred forms of the present invention as illustrated in the accompanying drawings, wherein:

Fig. 1 is a side view of the machine, parts of the inclined conveyor housing being broken away to show the solid screw blade and a part of the mixing portion paddles, Fig. 2 is a rear view thereof showing the arrangement of controls at the sacker's station, Figs. 3 and 4 are two views of the spray valve used in the machine, and Fig. 5 is an alternate form of spray valve that may be used, if variable pressure control of the spray valve is desired.

The inclined blender has a cylindrical casing 10, provided with inspection or access doors 11 extending along the mixer portion which is provided with paddles 12 extending from the conveyor shaft 13 and spaced along a helical axis thereabout, substantially in continuation of the helical axis of the base of the blade 14 of the solid screw portion of the blender.

The shaft 13 is journaled in the closed ends 15 and 16 of the cylindrical casing 10, which is supported at an angle of about 45° by a base piece 17 at its lower end 15 and by frame 18 near its upper end 16.

The blender motor 19 is mounted by means of bracket 20 on top of the casing 10 near its upper end. It is provided with a multi-groove drive pulley 21 connected by V belts 22 with similarly grooved driven pulley 23 which is fixed to the upper end of shaft 13.

A conduit 24 receives the blended mixture from the top of the blender cylinder 10 and delivers it to an inverted Y conduit 25 which has a flap operated by hand lever 26 to direct the mixture into one or the other of the two outlets 27 until the bag hung thereunder is filled, when it is flipped over to direct the mixture into the opposite outlet 27 where an empty bag has in the meantime been hung for filling. The bags may be readily hung and removed from the outlets 27 with the aid of the outwardly flanged mouth 28 of each outlet, and the surrounding resilient band 29 of coiled spring wire for holding the rim of the bag over the flanged mouth while the bag is being filled. A low ridge 30 is provided a short distance above the flanged mouth to facilitate holding the band 29 out of the way while replacing bags, by pushing it up over this ridge. When the rim of the new bag is in place around part of the mouth, the band is pulled over that portion of the rim, then successively over adjacent portions while the rest of the rim is moved under it immediately over the flange.

The blender cylinder 10 may have an inlet opening 31 at either of its opposite sides near the bottom, adapted for connection to the outlet end of a horizontal feed conveyor 32 extending to said side for delivering the dry, ground feed from a hopper 33 stationed conveniently near a grinder, where the dry feed is supplied to the hopper. Where the intake or lower end of the blender cylinder may be conveniently placed in such a position, the horizontal feed conveyor may be eliminated and a hopper mounted directly over an opening 31 made in the top of the cylinder 10 at its lower end.

The horizontal feed conveyor has a cylindrical casing 34 with a continuous screw blade 35 mounted on a shaft 36, which is driven by motor 37, through a variable speed V belt pulley system and the reduction gearing 38 which is coupled to the shaft 36 at 39. The variable speed pulley system includes a hinged mounting for the motor 37, so that it may be swung in a direction to increase the distance between the pulleys of the system to slow down the speed of the conveyor. When this distance is varied by adjustment of the control line 40 connected to the top of motor 37, the pulley on the motor shaft, which has separate discs forming the two sides of the V groove which discs are relatively slidable on said shaft and are biased toward each other by an external concentric spring, adjusts itself to accommodate the V belt at correspondingly different effective radii by squeezing the belt radially outwardly to an effective drive radius as large as permitted by the adjustment of the distance between pulleys. When this distance is increased, the effective drive radius is necessarily reduced, and since motor 37 is of the constant speed type, the reduction of the drive radius of the drive pulley obviously results in a reduction in the speed of the driven pulley and the conveyor. When the distance between pulleys is reduced, within the limits of the control, the effective radius of the drive pulley is increased, and thus the speed of the conveyor is increased accordingly. The speed of the conveyor determines the rate of delivery of the feed to the blender, provided the hopper is maintained substantially filled. If desired, the blender may be equipped with a conveyor of smaller capacity at each side, for receiving a total controlled amount of feed sufficient to meet the needs of the blender, so that its full capacity may be utilized, when the capacity of one feed grinder would not provide a sufficient source of supply for such full capacity of the blender. In such case, instead of only one control line 40, there would be two such lines operable in unison for simultaneous speed adjustment of both conveyors.

The line 40 is passed around guide pulleys 41 to a winch drum operated by the control crank 42 on the control panel 43 at one side of the back of the support frame 18. Other controls shown on this panel are the control switch 44 for the blender motor 19, the control switch 45 for the molasses pump (not shown) and control switch 45' for the feed conveyor motor 37.

The control panel at the other side of the back of the support frame 18 has the control 46 for the molasses metering valve, the pressure gauge 47 showing the molasses supply pressure, and the flowmeter gauge 48 showing the rate of flow of molasses to the spray valve 49 which may be mounted in the upper wall of the cylinder 10 near the lower end of the mixing portion of the blender, as shown in Fig. 1.

Valve 49 may be of the form shown in Figs. 3 and 4. Its base 50 conforms to the curvature of cylinder 10 and is fixed thereto over an opening to accommodate the operation of the spray injected through the wide conical valve 51. The valve is opened only upon sufficient pressure being built up in the chamber 52 to overcome the bias of spring 53 which otherwise maintains the valve firmly seated in closed position as shown. A fine spray is obtained by having a sufficiently strong spring 53 requiring a high pressure to open the valve. The amount of valve opening depends on the rate of flow. For more viscous liquids like molasses, especially when cold, a stronger spring is required than for less viscous liquids. The spring 53 therefore has to be designed in accordance with the viscosity of the liquid or molasses to be used, to get good results.

The valve chamber and valve stem casing are all in one piece and the valve stem casing is closed by cap 54, so that a complete seal against leakage is obtained in this construction. There are no bearing packings to contend with because the valve stem is entirely enclosed. However, the spring pressure cannot be adjusted, without disassembly and replacement of the spring, or adding washers under the spring to increase the pressure.

A satisfactory valve of the form shown in Fig. 5 has been found to provide adjustment of the spring pressure without disassembly, as well as good sealing without excessive binding at the packing. The valve stem 55 of this valve is extended through a packing bearing formed by a pipe fitting valve guide 56, packing 57 and pack nut 58 around the stem. The spring 59 is mounted around the valve stem over the outside of the pack nut 58 and an adjusting nut 60 is threaded on the threaded outer end portion 61 of the stem, over the spring 59. The nut 60 may be turned down against the spring to provide any spring pressure desired. The valve chamber is formed by a pipe T 62 and extends through a threaded coupling 63 on the outer end of which is formed the valve seat 64 for the wide cone valve 65. Installation of the valve is simple because it requires only a pipe tapped hole in the cylinder 10.

This valve is easy to make from ordinary pipe fittings, and requires no expensive casting like valve 49. The fact that it is adjustable during operation also makes it more preferable in some cases, even if it is subject to leakage under extremely high pressure conditions.

Many obvious modifications in the detail form and arrangements of parts may be made without departing from the spirit and scope of the present invention, as defined in the appended claims.

What is claimed is:

1. In a feed blender, a cylindrical casing closed at both ends, a blender shaft concentrically mounted in bearings in said ends, support means for holding one end of said casing in an elevated position, a screw conveyor fixed to the lowermost portion of said shaft, the remainder of the shaft being provided with mixing paddles, said casing being provided with an inlet for dry feed ingredients at the bottom and a discharge opening in its under side near the top, and a spray valve in the upper side of the cylindrical casing near the lower end of the paddle portion of said shaft, wherein said casing is inclined substantially 45°, and the spacing of said mixing paddles on said shaft is at intervals of about 45° around said shaft along a helical base line thereabout which is a continuation of the base line of the continuous screw blade of the conveyor on the lower portion of said shaft, said shaft having a drive connection at its upper end outside the end of said casing, and a drive motor mounted on the upper end of said casing, having a drive shaft operatively connected to said drive connection for driving said blender shaft, a collector conduit at the underside of the upper end of said cylindrical casing for receiving the mixture discharged by said blender, and an inverted Y conduit connected to the bottom of said collector conduit with a flap valve swingable at the juncture of the forked passages to close either passage for conducting said mixture into the other passage during sacking operation, each of said forked Y passage is provided with an outwardly flanged mouth and resilient means for holding the rim of a sack or bag over said flange while the sack is being filled, said spray valve being of the wide cone type biased into closed position by a sufficiently strong spring to produce a fine spray jet of the fluid being sprayed, said valve spring being adjustable during operation for obtaining the best spray pressure for the type of liquid being used at the particular time, a wide cone valve assembly comprising a pipe T having a pipe nipple in one end of its straight passage corresponding to the top of the T, the outer end of said nipple being ground in to form the conical valve seat, a valve having a matching conical valve head for seating thereon and a stem extending through said straight passage and having a threaded end portion, a valve guide bushing around said stem in the other end of said straight passage, packing in said valve guide, a packing nut for said packing, a valve spring around said stem outside said packing nut, and a nut on said threaded portion of said stem over said spring for adjusting the spring pressure.

2. In a feed blender, comprising a cylindrical casing closed at both ends, a blender shaft concentrically mounted in bearings in said ends, support means for holding one end of said casing in an elevated position, a screw conveyor fixed to the lowermost portion of said shaft, the remainder of the shaft being provided with mixing paddles, said casing being provided with an inlet for dry feed ingredients at the bottom and a discharge opening in its under side near the top, and a spray valve in the upper side of the cylindrical casing near the lower end of the paddle portion of said shaft, wherein said casing is inclined substantially 45°, and the spacing of said mixing paddles on said shaft is at intervals of about 45° around said shaft along a helical base line thereabout which is a continuation of the base line of the continuous screw blade of the conveyor on the lower portion of said shaft, said shaft having a drive connection at its upper end outside the end of said casing, and a drive motor mounted on the upper end of said casing having a drive shaft operatively connected to said drive connection for driving said blender shaft, a collector conduit at the underside of the upper end of said cylindrical casing for receiving the mixture discharged by said blender, and an inverted Y conduit connected to the bottom of said collector conduit with a flap valve swingable at the juncture of the forked passages to close either passage for conducting said mixture into the other passage during sacking operation, each of said forked Y passages is provided with an outwardly flanged mouth and resilient means for holding the rim of a sack or bag over said flange while the sack is being filled, and a horizontal conveyor extending to one side of said blender, and having its delivery end connected to an opening at the lower end of said casing, a hopper at the outer end of said conveyor, a drive motor hingedly mounted on said conveyor and having a variable speed drive pulley on its shaft for driving said conveyor, control means for rocking said motor on its hinge to vary said speed, and a control panel on said blender near the sacking station having a control hand crank connected to operate said control means.

3. The combination of claim 2, and a second horizontal conveyor extending to the other side of said blender, and having its delivery end connected to an opening on the opposite side of said casing, a hopper and drive motor with similar control means on said conveyor similar to those on the first conveyor, said similar control means being connected to said hand crank for simultaneous operation of both control means.

References Cited in the file of this patent

UNITED STATES PATENTS

| | | |
|---|---|---|
| 756,931 | Bradford | Apr. 12, 1904 |
| 854,165 | Hodge | May 21, 1907 |
| 1,003,006 | Maxwell | Sept. 12, 1911 |
| 2,509,431 | Hall et al. | May 30, 1950 |
| 2,553,788 | Richardson et al. | May 22, 1951 |